(12) United States Patent
Wedi (10) Patent No.: US 11,873,635 B2
(45) Date of Patent: Jan. 16, 2024

(54) DRAIN DEVICE HAVING AN ADAPTER FOR CONNECTING TO A PIPE

(71) Applicant: wedi GmbH, Emsdetten (DE)

(72) Inventor: Stephan Wedi, Emsdetten (DE)

(73) Assignee: WEDI GMBH, Emsdetten (DE)

( * ) Notice: Subject to any disclaimer, the term of this patent is extended or adjusted under 35 U.S.C. 154(b) by 280 days.

(21) Appl. No.: 17/603,660

(22) PCT Filed: Apr. 16, 2020

(86) PCT No.: PCT/EP2020/060732
§ 371 (c)(1),
(2) Date: Oct. 14, 2021

(87) PCT Pub. No.: WO2020/212506
PCT Pub. Date: Oct. 22, 2020

(65) Prior Publication Data
US 2022/0195712 A1    Jun. 23, 2022

(30) Foreign Application Priority Data
Apr. 18, 2019  (DE) .......................... 102019110322.3

(51) Int. Cl.
*E03F 5/04*    (2006.01)

(52) U.S. Cl.
CPC .................................. *E03F 5/0408* (2013.01)

(58) Field of Classification Search
CPC .. E03F 5/0407–0409; F16L 5/027; F16L 5/10
See application file for complete search history.

(56) References Cited

U.S. PATENT DOCUMENTS

| 4,313,286 A | 2/1982 | Harbeke |
| 5,451,081 A * | 9/1995 | Kaucnik ................. E02D 29/14 52/220.8 |

(Continued)

FOREIGN PATENT DOCUMENTS

| CA | 2813010 C | 9/2014 |
| DE | 69911137 T2 | 7/2004 |

(Continued)

OTHER PUBLICATIONS

Deutsches Patent—Und Markenamt (German Patent and Trademark Office), Recherchebericht (search in a related application), dated Feb. 21, 2020.

(Continued)

*Primary Examiner* — David P Angwin
*Assistant Examiner* — Nicholas A Ros
(74) *Attorney, Agent, or Firm* — Laurence P. Colton; SMITH TEMPEL BLAHA LLC (57) ABSTRACT

A drain device for a wet room having a plate element having an upper side, an underside and an opening, a drain body which can be installed in the opening of the plate element and which, in the usage position, has an upper inlet opening into which the waste water can enter and a lower outlet opening from which the waste water can exit, an adapter, which can be fitted onto the drain body, having an opening for transferring the waste water exiting the outlet opening of the drain body, a seal for producing a watertight connection with a pipe which receives the waste water. The seal can be inserted into the outer pipe stub of the adapter and seals the pipe with respect to the adapter with a degree of flexibility that allows the adapter to be fit onto the pipe and sealed in a watertight manner.

13 Claims, 6 Drawing Sheets

(56) References Cited

U.S. PATENT DOCUMENTS

2010/0320130 A1* 12/2010 Meyers .................. E03F 5/04
210/164
2019/0100906 A1* 4/2019 McLeod ............... E03F 5/0408

FOREIGN PATENT DOCUMENTS

| DE | 102014100932 A1 | | 7/2015 | |
|----|----|----|----|----|
| DE | 102014113094 A1 | | 3/2016 | |
| FR | 1432209 A | | 3/1966 | |
| KR | 20110092094 A | | 8/2011 | |
| KR | 20140016029 | * | 2/2014 | ............ E03F 5/0407 |

OTHER PUBLICATIONS

WIPO, International Search Report (in a related application), dated Jul. 29, 2020.

* cited by examiner

FIG. 13 ized professionals. The increases the costs of installation.

DRAIN DEVICE HAVING AN ADAPTER FOR CONNECTING TO A PIPE

CROSS REFERENCE TO RELATED APPLICATIONS

This application is the US National Phase of, and claims priority on and the benefit of, International Application No. PCT/EP2020/060732 having an International Filing Date of 16 Apr. 2020, which claims priority on German Patent Application No. 10 2019 110 322.3 having a filing date of 18 Apr. 2019.

BACKGROUND OF THE INVENTION

Technical Field

The invention relates to a drain device for a wet room, in particular for a shower, comprising
a plate element having an upper side, an underside and an opening,
a drain body which can be installed in the opening of the plate element and which, in the usage position, has an upper inlet opening into which the waste water can enter and a lower outlet opening from which the waste water can exit,
an adapter, which can be fitted onto the drain body, having an opening for transferring the waste water exiting the outlet opening of the drain body,
a seal for producing a watertight connection with a pipe which receives the waste water.

Prior Art

Figure 2:
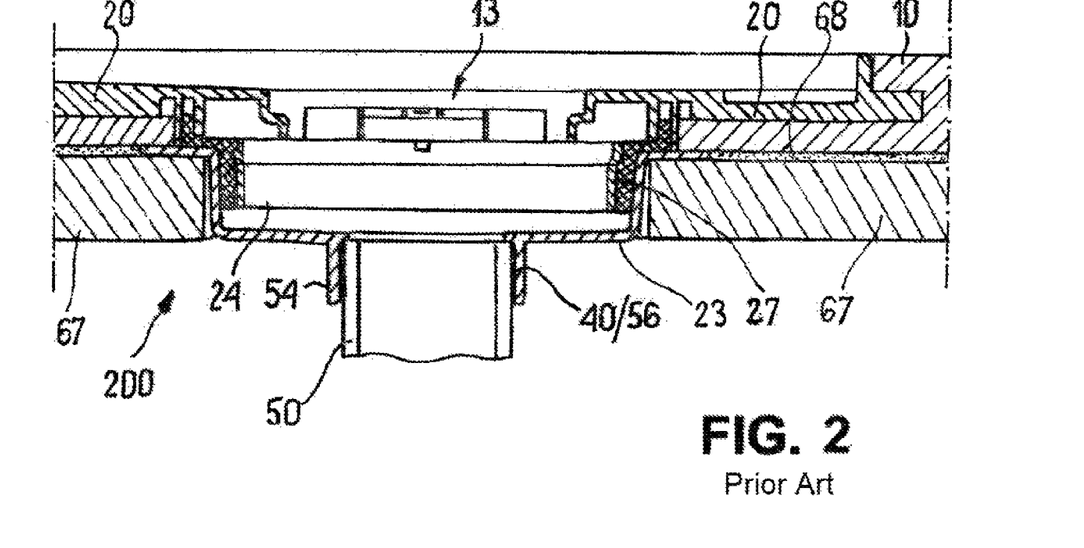
FIG. 2 shows a prior art drain device, in a schematic axial section.

Shown in FIG. 2 (prior art) is a schematic view of a generic drain device 200 in the installed state. The drain device 200 relates to a point drain and comprises a plate element 10, a channel-shaped drain body 20 installed in an opening 13 of the plate element 10, a circumferential profiled seal 27 between the drain body 20 and an underlying adapter 24 and a drain cup 23 that engages around the adapter 24. The drain cup 23 drains into a pipe stub 54. The pipe stub can be plugged onto a drain pipe 50. A watertight connection of the pipe stub 54 to the drain pipe 50 is produced by a seal 40 in the form of a circumferential bonding point 56.

In general, at the installation site, the drain pipe 50 is first fixed within an opening in a floor 67 so that it cannot be displaced in height or laterally. In the first step, the drain pipe is attached by the installer so that it is roughly flush with the floor or protrudes above the floor. In the second step, the drain pipe is shortened to a height that provides sufficient clearance for fitting the plate element 10 with the drain 200 onto the drain pipe 50. For this purpose, the installer must cut the drain pipe 50 to a precisely suitable length (height), specifically such that it is positioned exactly below the drain cup at the required height after inserting the adapter. If the drain pipe 50 is not sawn off deep enough, the plate element 10 with drain cup 23 and pipe stub 54 cannot be pushed down far enough to allow the plate element 10 to lie flush with the floor 67 or a mortar layer 68. On the other hand, if the drain pipe 50 is sawn off too deeply, the overlap region of pipe stub 54 and drain pipe 50 is reduced, thereby making it difficult to produce a watertight seal.

These circumstances lead to complications in the course of installation and increase the risk of leaks, which, in the worst case, only become apparent after the installation has been completed.

Furthermore, the sealing of pipe end 54 and drain pipe 50 using a circumferential bonding point 56 requires special expertise. In some countries, for example the United States of America, sealing work designed as bonding points in drain devices may only be performed by specially trained, authorized professionals. The increases the costs of installation.

BRIEF SUMMARY OF THE INVENTION

The object is therefore to propose a drain device of the type described above that is easy to install and is reliably watertight.

This object is achieved by a drain device of the type recited in the preamble, in which:
the adapter comprises an inner pipe stub and an outer pipe stub, wherein a peripheral groove, which can be fitted onto the pipe, is formed between the inner pipe stub and outer pipe stub,
the seal has an annular outer contour with which the seal can be inserted into the outer pipe stub of the adapter and, when fully assembled, seals the pipe with respect to the adapter,
the seal has a degree of flexibility that allows the adapter with inserted seal to be fit onto the pipe and sealed at the same time,
so that the drain device can be sealed in a watertight manner by attaching it onto the pipe by means of a frictional-fit crimp connection between the adapter and pipe.

The fact that the drain device according to the invention employs a separate seal that can be inserted into the adapter and attached to the drain pipe means that the conventional adhesive connection can be dispensed with. The seal and the adapter are matched to each other in such a way that a secure sealing connection can be made without an additional bonding point.

A frictional, watertight crimp connection between the adapter and pipe can be made by an average professional or handyman.

It is advantageous that with the drain device according to the invention, the number of parts can be reduced by omitting the drain cup and bonding point.

The drain body can be in the form of a channel drain or point drain, so that the complete drain device according to the invention can be installed on both channel and point drains. Furthermore, the drain device according to the invention can be placed anywhere on the shower base, for example on an outer edge or in its central region. The drain device according to the invention can therefore be assembled from modular system elements for point and linear flows.

The plate element can have at least one sloped section converging toward the opening. In the case of just one sloped section, the plate element may have a wedge-shaped lateral outline and taper into a substantially narrow slope-free strip. Several sloped sections of the plate element form a trough in whose center an opening is provided for receiving the drain body.

A separate, prefabricated part in the form of a rotation body can be provided as an adapter, which can be connected to the drain body. A connection point is preferably provided between the adapter and the drain element and is independent of the type of drain body selected. Thus, different drains, such as linear drains for drain channels and point drains for point wastewater discharges, preferably have the same connection points, so that a uniform drain is universally suitable for both linear and point drains.

The adapter can be injection molded or molded from plastic, for example a polycarbonate/acrylonitrile-butadiene-styrene (PC/ABS) based thermoplastic with high impact strength and heat resistance.

It is also not ruled out to make the adapter from a non-corrosive metal or metal alloy or composite (composite material) if a separate sealing ring is provided at the junction with the drain body.

It is advantageous that the circumferential groove of the adapter with its groove bottom can form a stop for the end of the drain pipe or of an upper sealing lip of the seal. This ensures compliance with the predefined sealing length and simplifies installation. Preferably the stop—in the installed state—lies in a plane defined by the underside of the plate element. Said plane corresponds to the visible or tread surface of the floor, for example a floor made of wood-based material. If the drain pipe projects above the floor, it can simply be cut to be flush with the top surface of the floor. Thus, the required arrangement of the end of the fixed drain pipe is determined. In the prior art design (FIG. 2), the drain pipe must necessarily be sawed off at a height distance, for example 1 to 2 cm below the floor level.

The seal can also be in the form of a rotation body made of plastic. The main materials for the rotation body are soft plastics with elastomeric properties, for example modified natural rubber, ethylene-propylene rubber (EPM/EPDM), isoprene rubber (IR), silicone rubber (Q) or their blends.

The seal has preferably an upper sealing lip which fits into the circumferential groove of the adapter such that, in the installed state, an annular portion of the sealing lip forms a seal between the stop/groove bottom of the adapter and the end of the drain pipe. The upper sealing lip thus protrudes beyond the end of the drain pipe. When the drain device is placed upon the drain pipe, the end of the drain pipe presses against the annular portion of the upper sealing lip, thus crimping the latter in a circumference predefined by the constructive design of the adapter (arrangement of the groove bottom opposite the end of the drain pipe or the bottom plane). This means that the seal inserted in this way can no longer slip downward or be pulled off and is thus fixed and secured in its position. Under certain conditions, said annular portion of the sealing lip can in addition have a sealing function.

The seal can comprise one, preferably a plurality of inwardly pointing lamellae, which flexibly abut the outer lateral surface of the drain pipe when the drain device is placed on it.

The seal preferably comprises an outer collar facing away from the sealing lip and which has a peripheral groove region for sliding onto the outer pipe stubs of the adapter. The groove region can form a functional boundary when fitting the seal onto the adapter, thus simplifying the assembly.

Preferably, the outer pipe stub of the adapter has a height that corresponds to a height of the seal. In the assembled state, the seal makes contact on its upper side to the groove bottom of the adapter and on its lower side to the circumferential edge of the outer pipe stub. As a result, the seal as a whole is arranged exactly in a predetermined position after insertion into the adapter.

It is advantageous that the upper sealing lip of the seal is received in the groove at the underside of the adapter and is crimped there when the seal is applied, which can additionally increase the water tightness.

In a preferred embodiment, the seal formed as a rotation body may comprise a plurality of flexible outer sealing rings. The sealing rings can each have a cross-section that is semi-circular or preferably one that is triangular, in particular wedge-shaped. Compared to a seal with a cylindrical outer surface, the sealing rings, in particular the wedge-shaped sealing rings tapering in the direction of insertion, facilitate the insertion of the seal into the adapter. A seal with outer sealing rings can thus be pushed into the adapter with little effort.

The adapter can be connected to the drain body in a form-fitting manner, preferably a frictional fit. A frictional-fit connection can be made via integrated thread structures in that the drain body has an internal thread and the mating piece, i.e., the adapter, has an external thread, or vice versa.

The frictional-fit connection can also be made by a snap-in or snap-on connection, a combined snap-in/screw connection or a bayonet connection, etc. A combined bayonet-screw connection has proved particularly advantageous, in which at least two, preferably up to six, threaded projections in the form of segmented recesses are arranged on the drain body, which engage with corresponding, inwardly directed projections on the adapter and are tightened during a rotation.

A least one upwardly directed, flexible sealing element can be arranged on the adapter, which sealing element is crimped between the adapter and drain body during tightening so that the overall connection is watertight. It is particularly advantageous when the material of the adapter is more rigid than the material of the sealing element.

The sealing element can be firmly attached to the adapter, for example glued on, welded on or inserted in a clamping region. The sealing element can be manufactured separately and pressed into a circumferential groove on the adapter, but preferably it is materially bonded to the adapter by injection molding or vulcanizing a plastic and/or elastic soft component directly onto a surface of an adapter collar or onto a sealing ring of the adapter.

The components of the drain device, in particular the drain body and adapter, can also be manufactured from the same plastic using a 3D-printing process (additive manufacturing).

BRIEF DESCRIPTION OF THE DRAWINGS

Further advantages and features of the invention are explained in more detail in the following exemplary embodiment with reference to the drawing, in which.

DETAILED DESCRIPTION OF PREFERRED EMBODIMENTS

In the following figures, identical or similar elements can be provided with identical or similar reference numbers. Furthermore, the figures of the drawing contain numerous features in combination in the description as well as in the claims. It is clear to a person skilled in the art that these features can also be considered individually or that they can be combined to form further combinations not described in detail here. The invention expressly extends also to such embodiments which are not given by combinations of features from explicit back references in the claims, whereby the disclosed features of the invention can be combined with each other in any way, inasmuch as this is technically reasonable. The exemplary embodiments shown in the figures thus have only a descriptive character and are not intended to limit the invention in any way.

Terms such as "upper", "lower", "below", etc. refer to an installed drain device, as also shown in the drawing, i.e., to the positioning of the components in the installed state.

Figure 1:
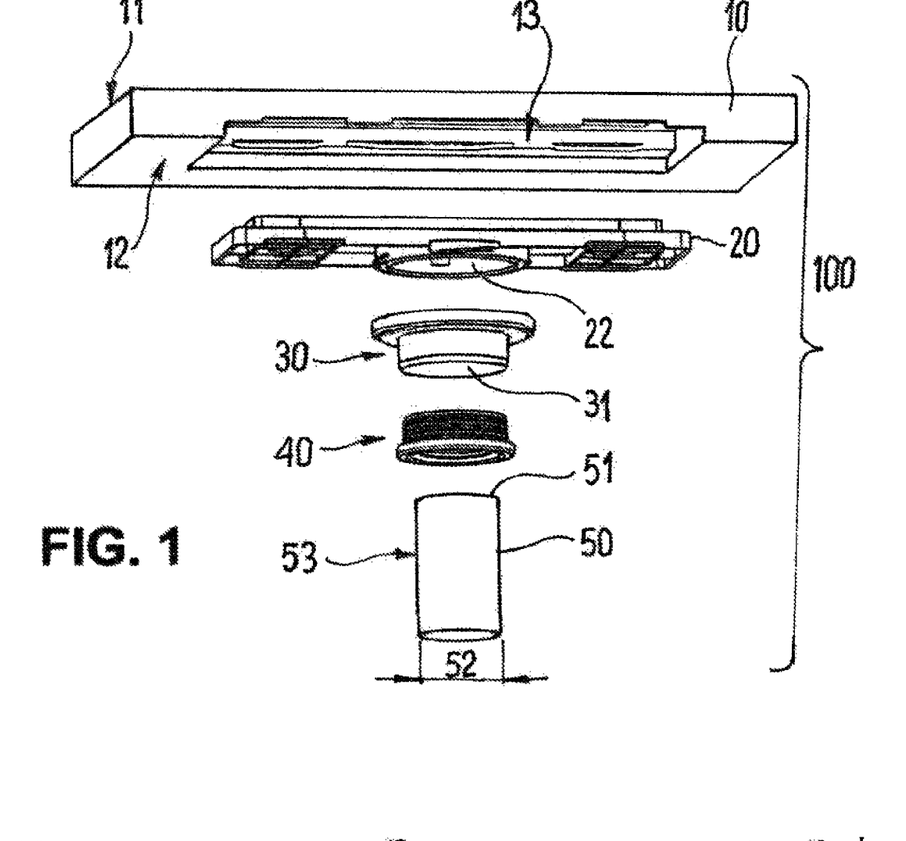
FIG. 1 shows a drain device in an exploded view.
Figure 5:
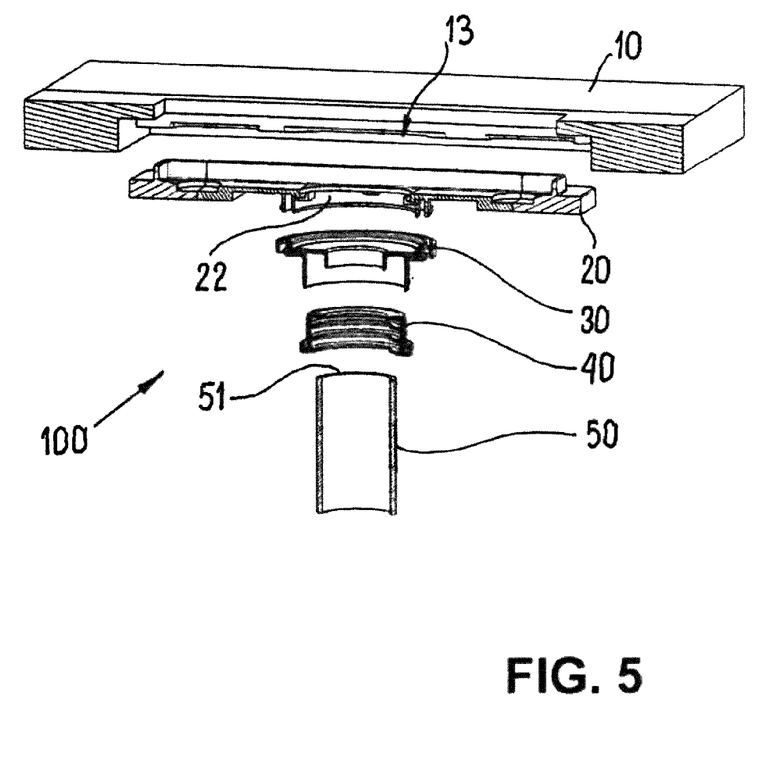
FIG. 5 shows the drain device of FIG. 1, in an axial section and in exploded view.

A drain device 100 shown in FIGS. 1 and 5 comprises a plate element 10, a drain body 20, an adapter 30 and seal 40. The drain body 20 is a linear channel drain, which is inserted into a recess of the plate element 10 which is compatible with this drain body 20. As an alternative to a plate element 10 with a channel-shaped drain element 20, a plate element having a point drain can also be provided (cf. FIGS. 6 and 7). Preferably, all different drain elements have a uniform connection point for connecting to the adapter 30, so that the same adapter can be used regardless of the selected drain variant.

The drain device 100 is attachable to a drain pipe 50. The plate element 10 has an upper side 11, an underside 12 facing away from the upper side and a continuous opening 13 (drain opening). Sloped regions 57 tapering toward the opening 13 are visible on the upper side 11 of the plate element 10. A product of the applicant, the firm wedi GmbH, Emsdetten, Germany, is used as the plate element 10 in the exemplary embodiment shown. The plate element 10 is made from HCFC-free, extruded polystyrene rigid foam with a closed cell structure and flame retardant additive.

The schematically indicated drain pipe (pipe 50) has an outer surface 53, an upper end 51 and an outer diameter 52.

Figure 6:
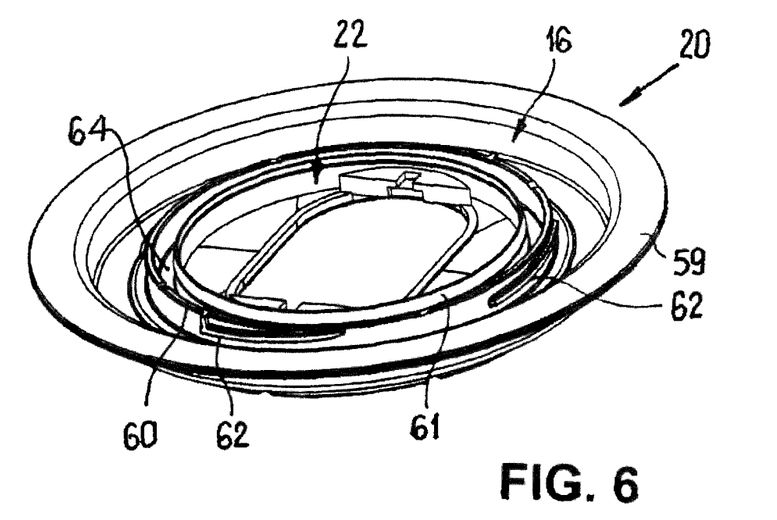
FIG. 6 shows a perspective view of the underside of a drain body.
Figure 7:
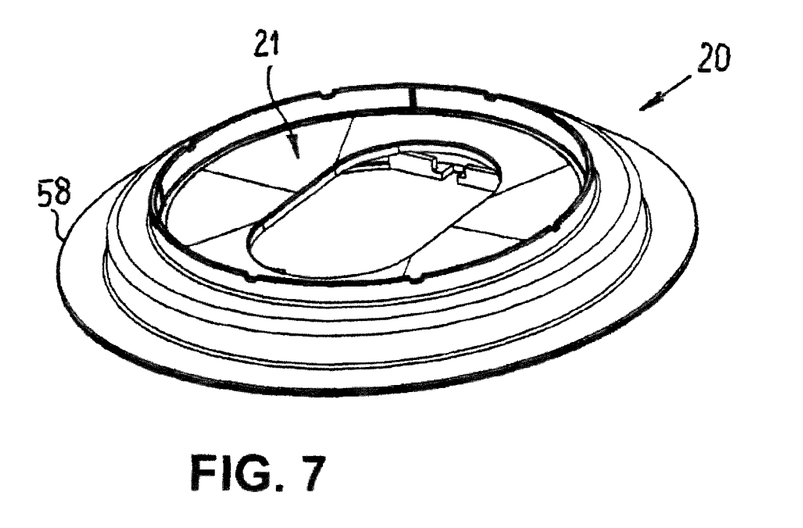
FIG. 7 shows a perspective view of the top side of the drain body of FIG. 6.

The drain body 20 shown in FIGS. 6 and 7 is a point drain with a round contour 58. The drain 20, shown as a point drain, comprises an inlet opening 21 and an outlet opening 22, an outer collar 59 and a structure marked "16" for connecting to the adapter 30. The structure 16 (cf. FIG. 6) consists of four segment-like threaded projections 62 extending along a first inner ring 60 for receiving mating structures (structures 16') on the adapter 30.

Furthermore, FIG. 6 shows a second inner ring 61 extending coaxially to the first inner ring 60. The two inner rings 60, 61 form a circumferential groove 64 for receiving an annular sealing element 17 of the adapter 30.

Figure 8:
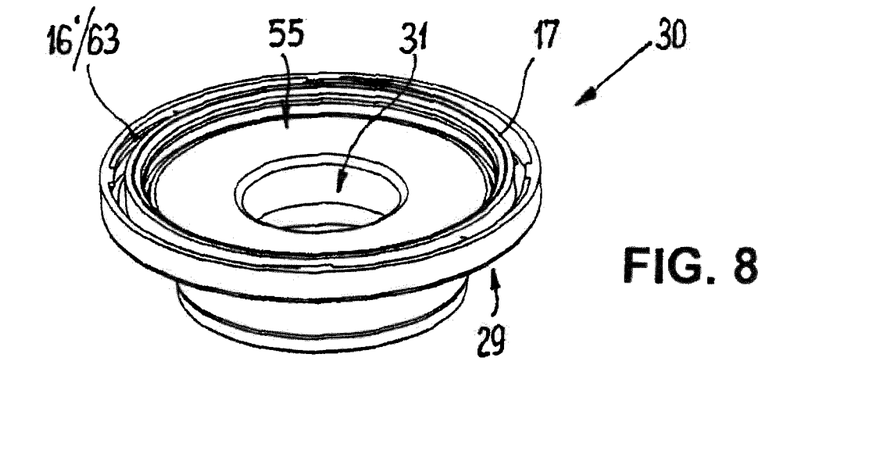
FIG. 8 shows a perspective view of the top side of an adapter.
Figure 9:
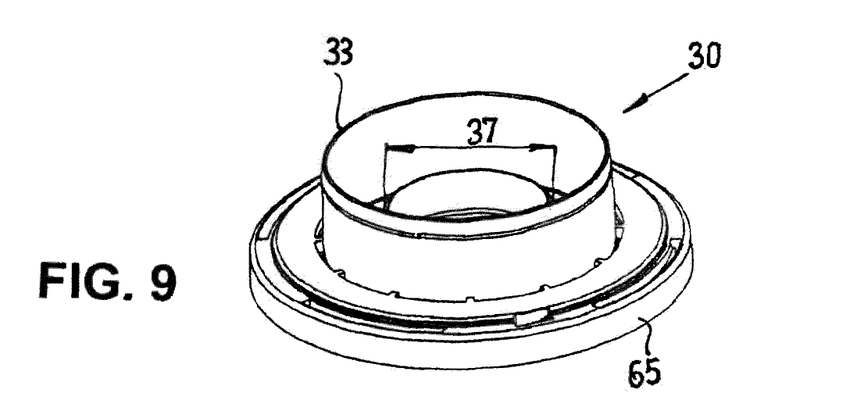
FIG. 9 shows a perspective view of the underside of the adapter of FIG. 8.
Figure 10:
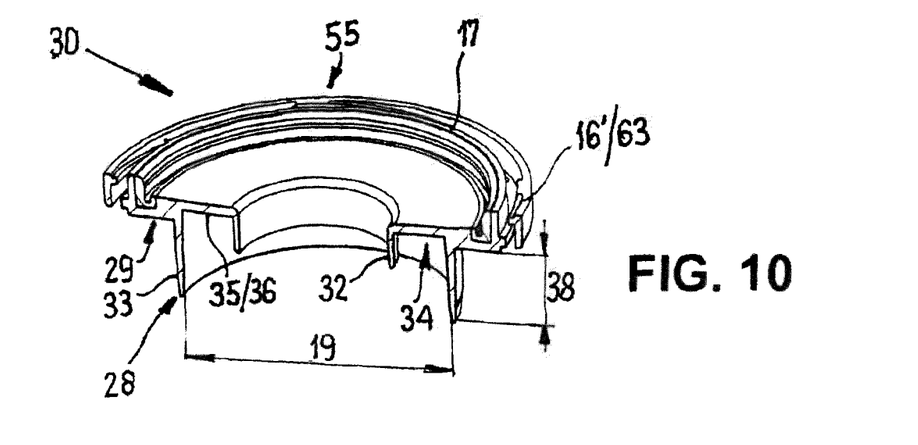
FIG. 10 shows the adapter of FIG. 8 in a perspective axial section.

The adapter 30 illustrated in FIGS. 8, 9 and 10 represents a rotation body comprising an outer collar 65, an inner pipe stub 32, an outer pipe stub 33, a groove 34 formed between the two pipe stubs 32, 33 on an underside 29 of the adapter 30, and a continuous opening 31. Located on an upper side 55 of the adapter 30 are the aforementioned structures 16', which each comprise inwardly directed projections 63 fitting into the threaded end 62, as well as the annular sealing element 17.

Figure 3:
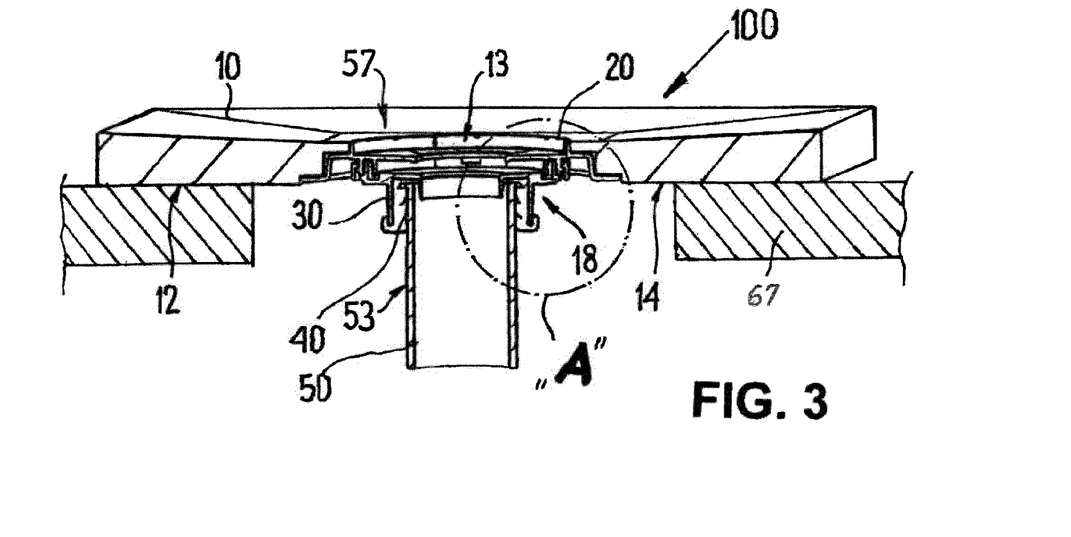
FIG. 3 shows an assembled drain device pursuant to FIG. 1, in a schematic axial section.

The groove 34 formed on the underside 29 of the adapter 30 is delimited by a groove bottom 35, which also forms a stop 36 for the end 51 of the drain pipe 50. The stop 36 lies in a plane 14 defined by the underside 12 of the plate element 10 (cf. FIG. 3). In the assembled state, the plane 14 of the plate element 10 lies on a floor 67, which can be a wood-beamed ceiling, for example. Depending on the existing requirements, the plate element 10 can be bonded to the floor 67 in the assembled state, for example with a silicone or mortar adhesive.

Figure 11:
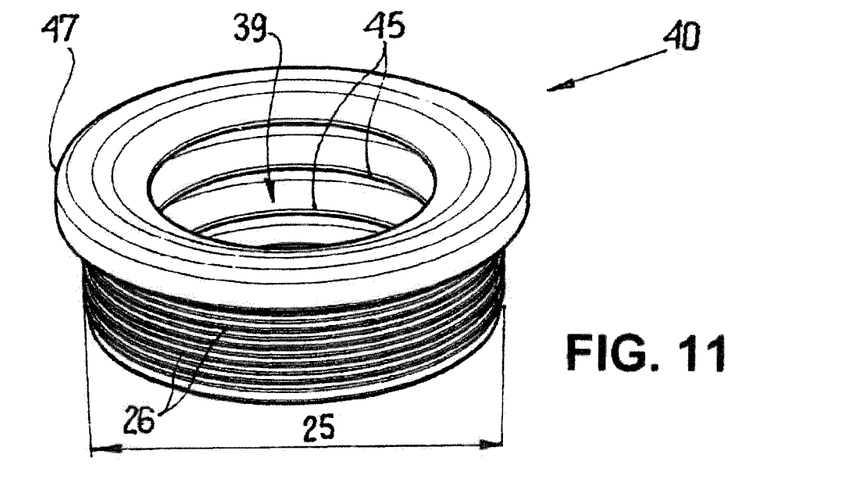
FIG. 11 shows a perspective view of the underside of a seal.
Figure 12:
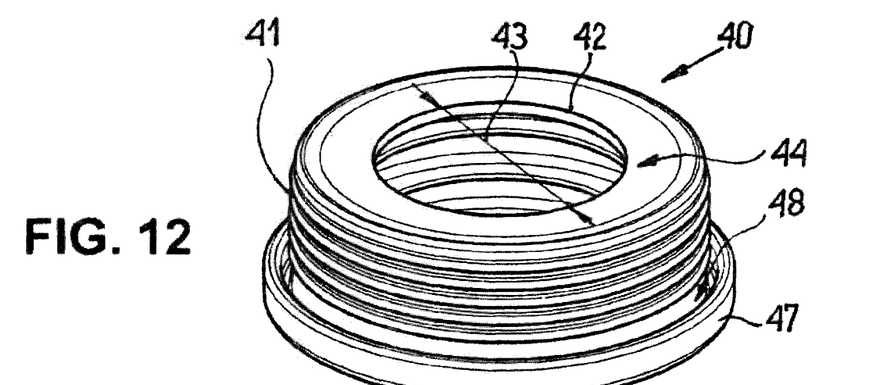
FIG. 12 shows a perspective view of the top side of the seal of FIG. 11.
Figure 13:
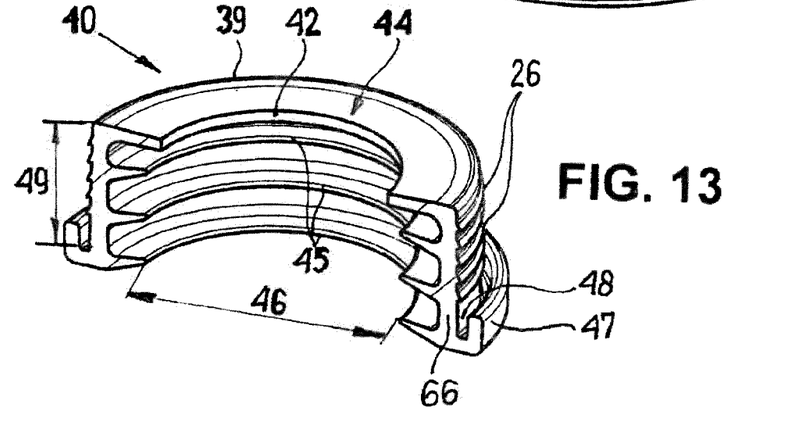
FIG. 13 shows the seal of FIG. 11 in a perspective axial section.

The seal 40 shown in FIGS. 11, 12 and 13 is in the form of a rotation body having an opening 39 and comprises a peripheral wall 66 having an inwardly directed upper sealing lip 42, three flexible lamellae 45 disposed below the sealing lip 42 and a plurality of sealing rings 26 forming an outer contour 41 of the revolution body and defining the outer diameter 25 of the insertable portion of the seal 40. The outer diameter 25 of the sealing rings 26 is slightly larger than an inner diameter 19 (cf. FIG. 10) of the outer pipe stub 33. As a result, the sealing rings 26 adapt to the inner contour the pipe stub 33 when the seal 40 is inserted into the outer pipe stub 33.

Figure 4:
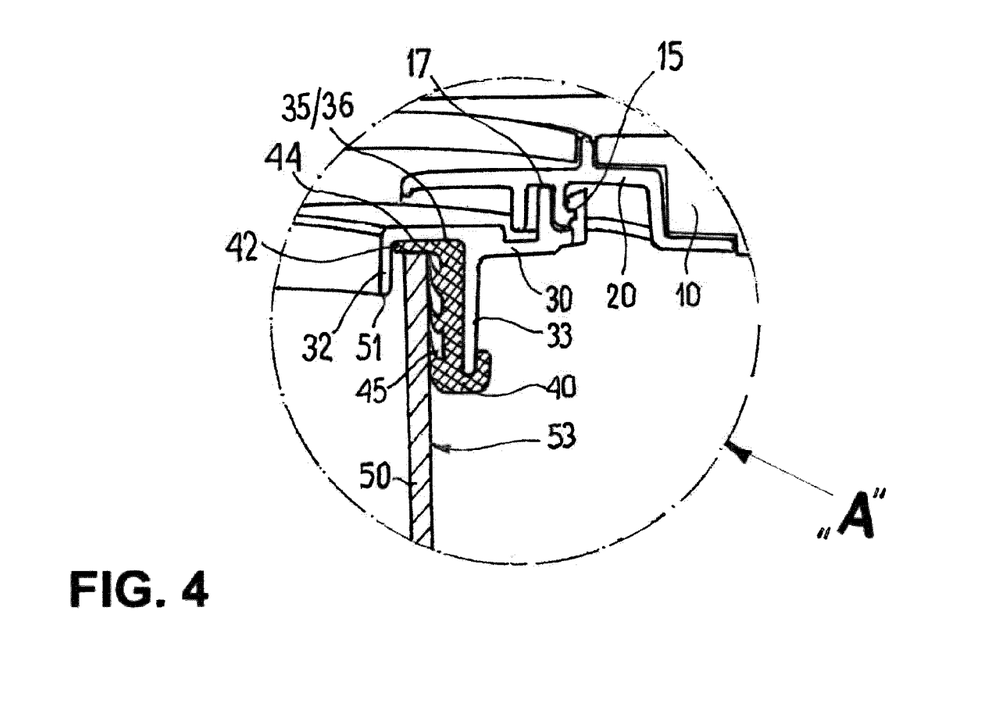
FIG. 4 shows a sub-area A of the drain device shown in FIG. 3.

In the shown exemplary embodiment, the sealing lip 42 has an inner diameter 43 (cf. FIG. 12), which is adapted to an outer diameter 37 of the inner pipe stub 32. In the assembled state, the sealing ring 43 thus projects with its annular section 44 beyond the end of the pipe 50 (cf. FIG. 4). As a result, the seal 40 in the assembled state is fixed on the end 51 of the pipe 50 such that it cannot slip downwards. The flexible, circular lamellae 45 have an inner diameter 46 that is smaller than the outer diameter 52 of the pipe 50. As a result, the lamellae 45 abut the outer wall of the drain pipe 50 when pushed onto it.

The wall 66 of the seal 40 transition to an outer collar 47, which forms a lower, circumferential groove region 48.

Furthermore, the seal 40 has a height 49 that corresponds to a height 38 of the outer pipe stub 33 of the adapter 30 such that the sealing lip 42 in the assembled state contacts the groove bottom 35 of the adapter 30 and the groove region 48 of the seal contacts an end region 28 of the outer pipe stub 33. This ensures that after inserting the seal 40 onto the outer pipe stub 33, it is seated in a predetermined position.

As shown in FIG. 13, sealing rings 26 are formed to be wedge-shaped at the top, i.e., in the push-on direction, which on the one hand has a centering effect when inserted into the adapter 30, and on the other hand reduces the force required for insertion. The sealing rings 26 thus slide over the inner side of the outer pipe stub 33 with little resistance yet still provide a seal.

The assembly of the drain device 100 starts by sawing off of the upwardly projecting drain pipe 50 along the plane 14, with the result that the end 51 of the drain pipe 50 thus produced is flush with said plane. In a further assembly step, the drain device is pre-assembled in that the drain body 20 is first fitted into the opening 13 of the plate element 10. The seal 40 is then inserted into the adapter 30 and the adapter 30 with inserted seal 40 is screwed into the drain body 20 and tightened, forming a frictional-fit bayonet screw connection 15. The bayonet screw connection shown in the exemplary embodiment comprises the connection structure 16 in the drain body 20 and a mating connection structure 16' on the upper side 55 of the adapter 30.

As an alternative to the described procedure, the seal 40 can also be inserted after the adapter 30 and the drain body 20 have been connected to each other. The drain device 100 preassembled in this way is ultimately also inserted into the drain pipe 50 until the end 51 of the drain pipe 50 presses against the groove bottom 35 (stop 36). In this position the underside 12 of the plate element 10 also rests securely on the base. For a permanent fixation of the plate element, a layer of mortar or silicone can be first applied to the base in order to bond the plate element to the base.

As a result, the fully assembled drain device 100 is fixed to the drain pipe 50 by means of a crimp connection 18. The crimp connection 18 is watertight and eliminates the need to glue the drain pipe 50 to any parts of the drain device 100 that contact the drain pipe 50.

LIST OF DESIGNATIONS 10 plate element
11 upper side (of 10)
12 underside (of 10)
13 opening (of 10)
14 plane
15 frictional-fit connection
16, 16' structure
17 sealing element
18 crimp connection
19 inner diameter (of 33)
20 drain body
21 inlet opening (of 20)
22 outlet opening (of 20)
23 drain cup (of 200)
24 drain body (of 200)
25 outer diameter (of 26)
26 sealing ring
27 profiled seal (of 200)
28 end region (of 33)
29 underside (of 30)
30 adapter
31 opening (of 30)
32 inner pipe stub
33 outer pipe stub
34 groove
35 groove bottom (of 34)
36 stop
37 outer diameter (of 32)
38 height (of 33)
39 opening (of 40)
40 sealing ring
41 outer contour (of 40)
42 upper sealing lip (of 40)
43 inner diameter (of 42)
44 section (of 40)
45 lamella
46 inner diameter (of 45)
47 collar
48 groove region
49 height (of 40)
50 pipe (drain pipe)
51 end (of 50)
52 outer diameter
53 outer surface (of 50)
54 pipe stub
55 upper side (of 30)
56 bonding point
57 sloped section
58 contour (of 20)
59 outer collar (of 20)
60 first inner ring (of 20)
61 second inner ring (of 20)
62 threaded end
63 projection
64 groove (of 20)
65 outer collar (of 30)
66 wall (of 40)
67 floor
68 mortar layer
100 drain device
200 drain device (prior art)
A sub-area

The invention claimed is:

1. A drain device (100) for a wet room, in particular for a shower, comprising:
a plate element (10) having an upper side (11), an underside (12) and an opening (13),
a drain body (20) configured to be installed in the opening (13) of the plate element (10) and which, in a usage position, has an upper inlet opening (21) into which waste water can enter and a lower outlet opening (22) from which the waste water can exit,
an adapter (30), configured to be fitted onto the drain body (20), having an opening (31) for transferring the waste water exiting the outlet opening (22) of the drain body (20), and
a seal (40) for producing a watertight connection with a pipe (50) which receives the waste water,
wherein
the adapter (30) comprises an inner pipe stub (32) and an outer pipe stub (33), wherein a peripheral groove (34), which is configured to be fitted onto the pipe (50), is formed between the inner pipe stub (32) and outer pipe (33) stub,
the seal (40) has an annular outer contour (41) with which the seal (40) is configured to be inserted into the outer pipe stub (33) of the adapter (30) and, when fully assembled, seals the pipe (50) with respect to the adapter (30), and
the seal (40) has a degree of flexibility that allows the adapter (30) with inserted seal (40) to be fit onto the pipe (50) and sealed at the same time,
whereby the drain device (100) is configured to be sealed in a watertight manner by attaching it onto the pipe (50) by means of a frictional-fit crimp connection (18) between adapter (30) and pipe (50).

2. The drain device (100) as claimed in claim 1, wherein the circumferential groove (34) has a groove bottom (35) which forms a stop (36) for one end (51) of the pipe (50).

3. The drain device (100) as claimed in claim 2, wherein the stop (36) in the installed state lies in a plane (14) formed by the underside (12) of the plate element (10).

4. The drain device (100) as claimed in claim 1, wherein the seal (40) has in the usage position, an upper sealing lip (42) whose inner diameter (43) is adapted to an outer diameter (37) of the inner pipe stub (32) such that, in the assembled state, an annular section (44) of the upper sealing lip (42) fixes the position of the seal on the pipe (50).

5. The drain device (100) as claimed in claim 1, wherein the seal (40) comprises one or more flexible lamellae (45), whose inner diameter (46) is smaller than an outer diameter (52) of the pipe (50) such that the lamellae (45) flexibly abut an outer surface (53) of the pipe (50) when the drain device (100) is placed on the pipe (50).

6. The drain device (100) as claimed in claim 1, wherein the seal (40) has an outer collar with a groove region (48) configured to be slid onto the outer pipe stub (33) of the adapter (30).

7. The drain device (100) as claimed in claim 1, wherein the outer pipe stub (33) has a height (38) which corresponds to a height (49) of the seal (40), so that, in the assembled state, the seal (40) makes contact on a sealing lip (42) of the seal (40) with the groove bottom (35) of the adapter (30) and on a groove region (48) of the seal (40) with an end region (28) of the outer pipe stub (33).

8. The drain device (100) as claimed in claim 1, wherein the seal (40) with a sealing lip (42) of the seal (40) is received in the groove (34) at an underside (29) of the adapter (30).

9. The drain device (100) as claimed in claim 1, wherein the seal (40) comprises flexible outer sealing rings (26), whose outer diameter (25) is larger than an inner diameter (19) of the outer pipe stub (33) of the adapter (30), so that the outer sealing rings (26) adapt to the inner contour of the pipe stub (33) when the seal (40) finis inserted into the outer pipe stub (33) and seals it.

10. The drain device (100) as claimed in claim 1, wherein the adapter (30) and the drain body (20) are connected to each other via a frictional-fit connection (15).

11. The drain device (100) as claimed in claim 10, wherein the frictional-fit connection (15) has a structure (16, 16') comprising a first part (16) integrated in the adapter (30) and a second part (16') integrated into the drain body (20), so that the adapter (30) can be screwed and/or inserted on the drain body (20).

12. The drain device (100) as claimed in claim 11, wherein the frictional-fit connection (15) is a single-start or multi-start threaded structure, a snap-in connection, a snap-on connection, a combined snap-in/screw connection or a bayonet connection produced by the structure (16, 16').

13. The drain device (100) as claimed in claim 1, wherein the adapter (30) comprises a flexible sealing element (17) that is connected to the adapter (30) by a material bond.

* * * * *